A. ALBRIGHT.
Rubber-Coated Rosettes, Bosses, and other Ornaments for Harness and Carriages.

No. 150,996.  Patented May 19, 1874.

Witnesses.
Francis Clare Bowers
V. C. Clayton

Inventor.
Andrew Albright

UNITED STATES PATENT OFFICE.

ANDREW ALBRIGHT, OF NEWARK, NEW JERSEY.

IMPROVEMENT IN RUBBER-COATED ROSETTES, BOSSES, AND OTHER ORNAMENTS FOR HARNESS AND CARRIAGES.

Specification forming part of Letters Patent No. 150,996, dated May 19, 1874; application filed January 27, 1874.

*To all whom it may concern:*

Be it known that I, ANDREW ALBRIGHT, of Newark, in the county of Essex and in the State of New Jersey, have invented certain new and useful Improvements in Rubber-Coated Articles; and I do hereby declare that the following is a full, clear, and exact description thereof, reference being had to the accompanying drawings forming a part of this specification.

This invention relates to the manufacture of rubber-coated rosettes, bosses, and other ornaments for harness and carriages.

Figure 1:
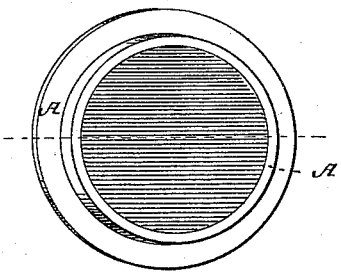
Figure 3:
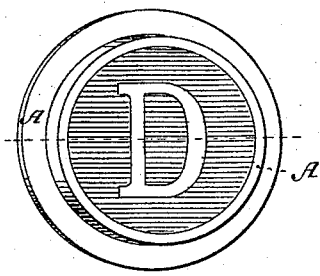
Figure 2:
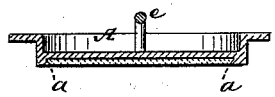
Figure 4:
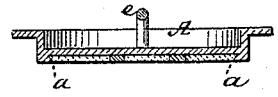

In the drawings, Figure 1 is a perspective view, showing a plain rosette for a bridle. Fig. 2 is a cross-section of the same. Figs. 3 and 4 show a similar rosette, with a metallic central ornament.

This specification describes a new manufacture, and the processes by which it is made.

The metallic body A of the rosette, boss, or other ornament is cast, pressed, turned, or spun into the desired shape, having a cup in its upper surface to receive the rubber coating. For the best goods, I prefer that this body shall be cast of oroide or white metal, and be turned true, with the inside of the cup dovetailed, as at $a$, but can dispense with dovetailing. An eye, $e$, or similar device, at the under side of the ornament, serves to secure it in place. A piece of plastic sheet-rubber, of the desired shape to a trifle more than fill it, is then placed in the cup. The cup, rubber, and die are all heated, and die-pressure is applied, so as to force the plastic rubber down into the cup, in close contact with the metal and flush with the edge of the cup. The article is then put into the vulcanizer, and the rubber vulcanized as usual. The exposed metal is then plated as desired, if not previously plated, and the article is burnished or finished.

When a central ornament, a letter, monogram, arabesque, or other device is to be used, I take the metal body above described, then place within it the desired central ornament cut out of sheet metal, and fasten it or not to the body by soldering or otherwise. I then lay over the central ornament and the cup the sheet of plastic rubber, and submit to die-pressure, as above, and then in like manner vulcanize and finish; or, I take a plain rosette, after its rubber coating has been vulcanized, and press into it the central ornament. In order to do this, the metallic body and its rubber coating are heated until the rubber becomes quite plastic. The metallic central ornament is then placed upon it, and die-pressure of heated dies then presses the ornament down into the rubber. But the process which I generally use is as follows: After heating the cup, as above described, I take a piece of sheet vulcanized rubber, or of other suitable composition, cut to fit easily in the cup, and heat it so as to be plastic. I then put upon the rubber the central ornament, cut out of sheet metal, of the desired thickness. The heated die, of suitable construction, is then applied and pressed down upon the rubber and the ornament, so as to embed the ornament within the rubber and the rubber within the cup, and then finish as before.

Instead of using plastic rubber, I may use other known like compressible compositions, such as pyroxylene or celluloid, and omit vulcanization. In other respects the processes of using such compositions are the same.

I do not limit myself to the use of the above-described processes.

I claim—

Harness and carriage ornaments, constructed as herein set forth.

In testimony that I claim the above-described invention, I have hereunto signed my name this 16th day of January, 1874.

ANDREW ALBRIGHT.

Witnesses:
  J. C. CLAYTON,
  FRANCIS C. BOWEN.